US009230365B2

(12) United States Patent
Barcay et al.

(10) Patent No.: US 9,230,365 B2
(45) Date of Patent: *Jan. 5, 2016

(54) TOURING IN A GEOGRAPHIC INFORMATION SYSTEM

(75) Inventors: Daniel Barcay, Palo Alto, CA (US); Michael Weiss-Malik, San Jose, CA (US)

(73) Assignee: Google Inc., Mountain View, CA (US)

( * ) Notice: Subject to any disclaimer, the term of this patent is extended or adjusted under 35 U.S.C. 154(b) by 541 days.

This patent is subject to a terminal disclaimer.

(21) Appl. No.: 13/603,717

(22) Filed: Sep. 5, 2012

(65) Prior Publication Data

US 2012/0331416 A1  Dec. 27, 2012

Related U.S. Application Data

(63) Continuation of application No. 12/538,590, filed on Aug. 10, 2009, now Pat. No. 8,302,007.

(60) Provisional application No. 61/136,093, filed on Aug. 12, 2008.

(51) Int. Cl.
*G06F 3/00* (2006.01)
*G06T 17/05* (2011.01)
*G06T 19/00* (2011.01)
*G06F 3/01* (2006.01)

(52) U.S. Cl.
CPC .............. *G06T 17/05* (2013.01); *G06T 19/003* (2013.01)

(58) Field of Classification Search
None
See application file for complete search history.

(56) References Cited

U.S. PATENT DOCUMENTS

| 6,839,880 | B1 | 1/2005 | Morse et al. | |
|---|---|---|---|---|
| 7,240,108 | B2 | 7/2007 | Smith et al. | |
| 7,353,114 | B1* | 4/2008 | Rohlf et al. | 702/5 |
| 2001/0034661 | A1* | 10/2001 | Ferreira | 705/26 |
| 2002/0002571 | A1* | 1/2002 | Manohar et al. | 707/526 |
| 2002/0093541 | A1 | 7/2002 | Schileru-Key | |
| 2003/0041087 | A1* | 2/2003 | Pothos et al. | 709/102 |
| 2003/0063133 | A1 | 4/2003 | Foote et al. | |
| 2003/0212536 | A1* | 11/2003 | Wang et al. | 703/6 |
| 2004/0218894 | A1* | 11/2004 | Harville et al. | 386/46 |
| 2004/0218910 | A1 | 11/2004 | Chang et al. | |

(Continued)

FOREIGN PATENT DOCUMENTS

JP  11-259685 A  9/1999
JP  2001-195491 A  7/2001

(Continued)

OTHER PUBLICATIONS

The State Intellectual Property Office of the People's Republic of China, "Notification of the First Office Action," Application No. 200980139901.6, Date of Issuing: Mar. 5, 2013, (English-language translation provided), 15 pages.

(Continued)

*Primary Examiner* — Amy Ng
*Assistant Examiner* — Toan Vu
(74) *Attorney, Agent, or Firm* — Dority & Manning, P.A.

(57) ABSTRACT

The present invention relates to navigating in a geographic information system. In an embodiment, a method tours geographic information in a geographic information system. A set of actions for a tour is received. Each action includes a tour time. A tour time of at least one of the actions is defined by a user. Each action in the set of actions is executed to tour geographic information in the geographic information system.

20 Claims, 11 Drawing Sheets

(56) References Cited

U.S. PATENT DOCUMENTS

| | | | |
|---|---|---|---|
| 2004/0239699 | A1 | 12/2004 | Uyttendaele et al. |
| 2006/0188230 | A1* | 8/2006 | An ................................. 386/95 |
| 2006/0232605 | A1 | 10/2006 | Imamura |
| 2007/0078935 | A1* | 4/2007 | Garcia-Martin et al. ..... 709/206 |
| 2007/0098357 | A1* | 5/2007 | McEnroe et al. ............... 386/68 |
| 2007/0173956 | A1 | 7/2007 | Koch et al. |
| 2007/0174774 | A1* | 7/2007 | Lerman et al. ................ 715/723 |
| 2007/0244634 | A1* | 10/2007 | Koch et al. .................... 701/207 |
| 2007/0256023 | A1* | 11/2007 | Noessel et al. ................ 715/753 |
| 2007/0294622 | A1* | 12/2007 | Sterner et al. ................. 715/716 |
| 2008/0033641 | A1* | 2/2008 | Medalia ........................ 701/209 |
| 2008/0055306 | A1* | 3/2008 | Kwok et al. .................. 345/419 |
| 2008/0092168 | A1* | 4/2008 | Logan et al. .................... 725/44 |
| 2008/0109433 | A1* | 5/2008 | Rose ................................ 707/6 |
| 2008/0129528 | A1 | 6/2008 | Guthrie |
| 2008/0177793 | A1* | 7/2008 | Epstein et al. ............. 707/104.1 |
| 2008/0184122 | A1* | 7/2008 | Grant et al. ................... 715/723 |
| 2008/0215983 | A1 | 9/2008 | Wierowski et al. |
| 2008/0291279 | A1* | 11/2008 | Samarasekera et al. ...... 348/159 |
| 2008/0294990 | A1* | 11/2008 | Morris et al. ................. 715/719 |
| 2009/0109223 | A1* | 4/2009 | Schalla et al. ................ 345/427 |
| 2010/0063726 | A1* | 3/2010 | Marjenberg et al. .......... 701/207 |
| 2010/0217458 | A1* | 8/2010 | Schweiger et al. ............... 701/3 |
| 2011/0107220 | A1* | 5/2011 | Perlman ........................ 715/720 |
| 2011/0196897 | A1 | 8/2011 | Koch et al. |

FOREIGN PATENT DOCUMENTS

| | | |
|---|---|---|
| JP | 2006-155231 A | 6/2006 |
| WO | WO 2004/003852 A1 | 1/2004 |
| WO | WO 2004/017233 A1 | 2/2004 |
| WO | WO 2007/019021 A | 2/2007 |
| WO | WO 2007/124512 A | 11/2007 |

OTHER PUBLICATIONS

English language Abstract of Japanese Patent Publication No. 11-259685 A, published Sep. 24, 1999, Japanese Patent Office, Patent & Utility Model Gazette DB, Patent Abstract of Japan.

English language Abstract of International Publication No. WO 2004/003852 A1, published Jan. 8, 2004, European Patent Office, Espacenet Database—Worldwide.

English language Abstract of Japanese Patent Publication No. 2006-155231 A, published Jun. 15, 2006, Japanese Patent Office, Patent & Utility Model Gazette DB, Patent Abstract of Japan.

Office Action mailed Sep. 3, 2013, in Japanese Patent Application No. 2011-522976 A, filed Aug. 4, 2011 with English language translation of the Office Action.

The State Intellectual Property Office of the People;'s Republic of China, Notification of the Second Office Action, Date of issuing: Nov. 8, 2013, Appln. No. 200980139901.6, 3 pages (*English-language translation attached—4 pages*).

Vlachos et al., "Smooth $C^2$ Quaternion-Based Flythrough Paths," Game Programming Gems 2, edited by Mark A. Deloura, Jan. 1, 2001, pp. 220-227.

Right Hemisphere, "Deep Exploration 5.0 Tutorial Camera Path Trajectory Editing #1," Jan. 1, 2007, pp. 1-10.

Snavely N. et al., "Photo Tourism: Exploring Photo Collections in 3D," Siggraph Conference Proceedings, vol. 25, No. 3, Jan. 1, 2006, pp. 835-846.

Google Earth User Guide, http://www.docstoc.com/docs/4625050/Google-Earth-User-Guide, retrieved Jan. 11, 2009, copyright marked 2007, 131 pages.

PCT, "International Search Report and Written Opinion of the International Searching Authority for International Appln. No. PCT/US2009/004565," mailed Dec. 1, 2009, European Patent Office, 22 pages.

International Preliminary Report on Patentability and Written Opinion of the International Searching Authority in International Application No. PCT/US2009/004565, mailed on Feb. 24, 2011, 14 pages.

Communication pursuant to Article 94(3) EPC in European Application No. 09 789 098.2-2218, mailed on Aug. 3, 2011, 4 pages.

Communication pursuant to Article 94(3) EPC in European Application No. 09 789 098.2-2218, mailed on Mar. 12, 2012, 7 pages.

\* cited by examiner

```
        <Tour id="RevolutionTour">
            <LookAt> <!-- The Initial view of the tour -->
            ...
            </LookAt>
            <Playlist>
            <FlyTo>
                <dur>10</dur>
                <type>"bounce"</type>
812         <LookAt>...</LookAt>
            </FlyTo>
            <Wait>
                <dur>1.0</dur>
814         </Wait>
<!-- Activate the balloon for the Boston Tea Party-->
<!-- Wait until the user hits play again -->
            <TourControl>
                <type>"pause"</type>
816         </TourControl>
            <Wait>
                <dur>0.2</dur>
818         <Wait>
<!-- Turn the Boston Tea Party Balloon off -->
<!-- Fly to the American Revolution Placemark -->
            <FlyTo>
                <dur>10.0</end>
820             <type>"bounce"</type>
                <Camera> ...<Camera>
            </FlyTo>
<!-- Turn the American Revolution Balloon on -->
<!-- Wait for 5 seconds. -->
            <Wait>
822             <dur>5.0</dur>
            </Wait>
<!-- Turn the American Revolution balloon off -->
            </Playlist>
        </Tour>
```

FIG. 8-2

TOURING IN A GEOGRAPHIC INFORMATION SYSTEM

This application is a Continuation of co-pending U.S. application Ser. No. 12/538,590 filed on Aug. 10, 2009, which is a Non-Provisional of U.S. Application No. 61/136,093, filed Aug. 12, 2008, both of which are incorporated herein by reference in their entirety.

BACKGROUND

1. Field of the Invention

The present invention relates to navigating in a geographic information system.

2. Related Art

A geographic information system (GIS) is a system for archiving, retrieving, displaying and/or manipulating data indexed according to the data elements' geographic coordinates. The data element may be a variety of data types such as, for example, imagery, maps, models of buildings and terrain and other geographic features.

A geographic information system may display geographic information to a user from a perspective of a virtual camera. The perspective of a virtual camera may be defined by a position and orientation. By changing the position and orientation of the virtual camera, the user can sightsee within geographic information. For example, the user may "visit" the Eiffel Tower in the GIS by directing a perspective of a virtual camera toward a representation of the Eiffel Tower.

A perspective of a virtual camera may be stored in a language such as Keyhole Markup Language (KML). Interpreting the KML, a GIS may move the virtual camera to a stored perspective to display a sight. Using the stored perspective, a user can return to the sight. Further, KML can store a sequence of perspectives. Interpreting the KML, the GIS may move the virtual camera iteratively from one perspective to the next. This enables the user to view a series of sights, e.g., the Eiffel Tower, Big Ben, etc. However, this approach may only provide a limited user experience.

Methods and systems are needed for sightseeing in a geographic information that provide a more satisfying user experience.

BRIEF SUMMARY

The present invention relates to navigating in a geographic information system. In an embodiment, a method tours geographic information in a geographic information system. A set of actions for a tour is received. Each action includes a tour time. A tour time of at least one of the actions is defined by a user. Each action in the set of actions is executed to tour geographic information in the geographic information system.

In a second embodiment, a geographic information system tours geographic information. The geographic information system includes a tour controller that receives a set of actions for a tour. Each action includes a tour time. A tour time of at least one of the actions is defined by a user and executes each action in the set of actions to tour geographic information in the geographic information system.

In a third embodiment, a method tours geographic information in a geographic information system. A set of actions for a tour is received. At least one action in the set of actions includes a feature time. A feature is received. The feature has an associated feature time period and a position in the geographic information. Each action in the set of actions is executed to tour geographic information in the geographic information system. A current feature time is determined based on a current tour time. When the current feature is during the associated feature time period and the position is in a view frustum of the virtual camera, the feature is displayed.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 8-1 and 8-2 show a portion of KML code defining a tour according to the schema illustrated in FIG. 7

The drawing in which an element first appears is typically indicated by the leftmost digit or digits in the corresponding reference number. In the drawings, like reference numbers may indicate identical or functionally similar elements.

DETAILED DESCRIPTION OF EMBODIMENTS

Figure 1A:
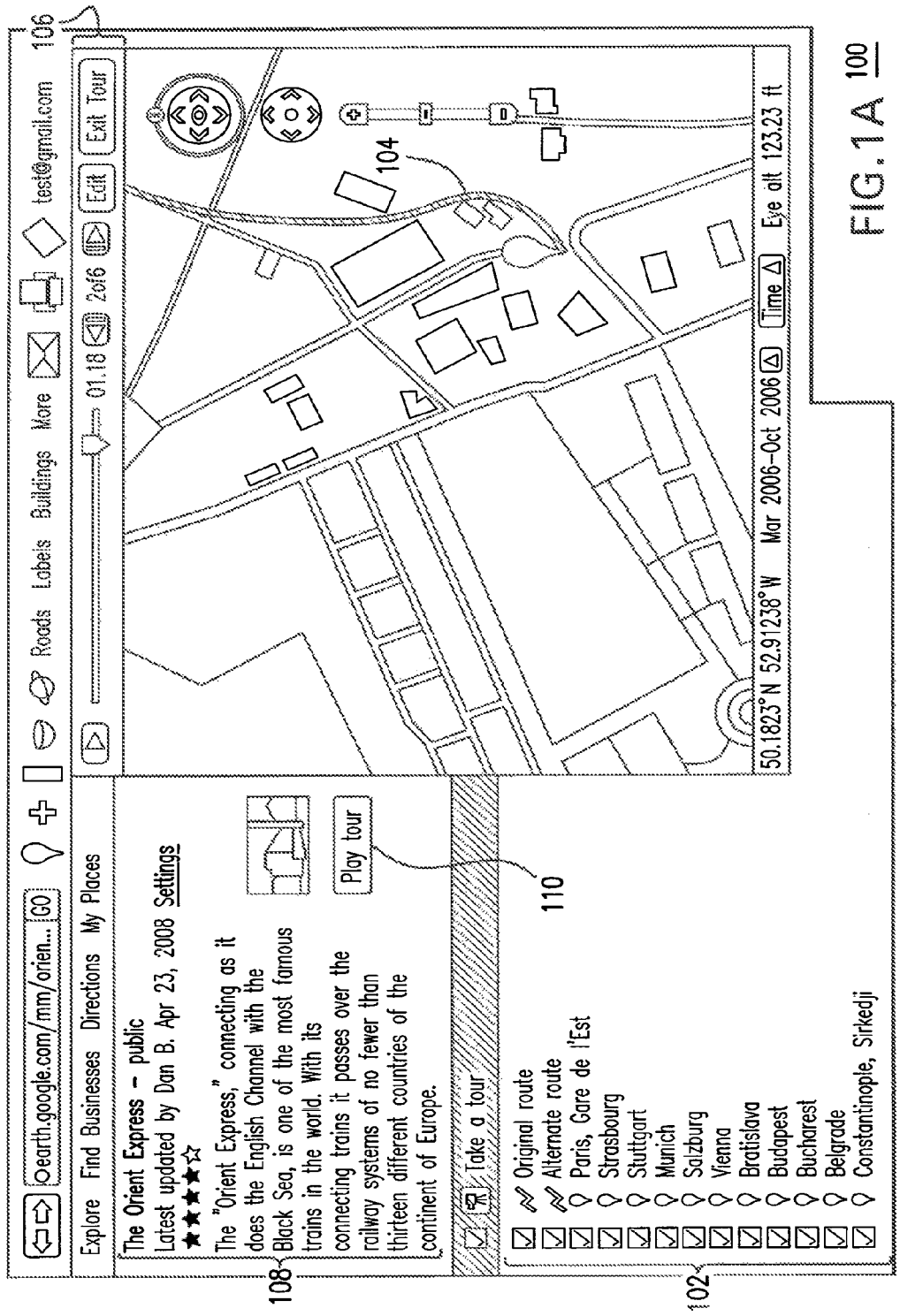
FIG. 1A is a screenshot of a GIS previewing a tour according to an embodiment.

This invention relates to touring in a geographic information system. In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments provide a guided tour experience in an a GIS such as the Google™ Earth system, available at http://earth.google.com. To provide the guided tour experience, embodiments maintain a timeline for the tour. Each action on the tour, such as moving a virtual camera to a new position, has a tour time in the tour timeline. By executing actions on at defined times on a tour timeline, embodiments provide a more satisfying user experience.

In an embodiment, a user may define a set of actions for a tour. One type of action, which may be referred to herein as a fly-to action, may include a tour time and a position in the geographic data. From the fly-to actions, a path through the geographic information may be determined. A virtual camera may move along the path. Moving through the path, the virtual camera's speed may be determined according to the tour times of the fly-to actions. In one embodiment, the tour time of an action may specify when a camera reaches a position defined by the action. In another embodiment, a tour time may specify how long an action takes to elapse before the next action occurs. By using an action's tour times to regulate the virtual camera's speed, embodiments of the present invention provide the user with a more satisfying user experience.

In an embodiment, a user may override a tour. For example, a user may interrupt the tour with timeline controls, such as pause, rewind, fast-forward, and chapter-skip. Using these controls, the user may control passage of the tour time. Further, when the tour is interrupted, the user may deviate from the tour path to explore the surrounding three dimensional environment. The user may resume the tour, which returns the virtual camera to the tour path.

In another example, the user may override the tour by modifying an orientation of the virtual camera. In this way, the user may "look around" during the tour. Looking around may or may not interrupt progression of the tour. These features also provide a more satisfying user experience.

In a farther embodiment, a tour travels through a history defined in a GIS. In addition to being spatially registered, features in a GIS may be registered in time. As used herein, the term feature includes any geographic data including, but not limited to, historical imagery, the sun, the moon or other geographic data. For example, the GIS may have the Colossus spatially registered to Rhodes, Greece and temporally registered to 280-226 BC. For clarity, time associated with features in a GIS is referred to herein as "feature time." The tour may take the user through feature time. For example, each action may have a feature time associated with it. Based on the actions, a relationship between a tour time, a feature time and a position may be determined. As the tour time elapses, a position of the virtual camera and a feature time may both change. In this way, a GIS playing a tour may show the user the Colossus of ancient Greece followed by the Eiffel tower of modern Paris. These embodiments are described in more detail below with respect to the figures.

FIG. 1A shows a screenshot 100 of a GIS illustrating a tour according to an embodiment of the present invention. In an embodiment, a GIS may display screenshot 100 to preview a tour. The tour is also listed in a panel 102 along with other content. A path 104 illustrates the path taken by a virtual camera during the tour. Screenshot 100 offers a user an opportunity to edit the tour with edit controls 106. Editing a tour is described in more detail below. Screenshot 100 also briefly describes the tour in a frame 108. Frame 108 includes a button 110. When a user selects button 110, the GIS may start to play the tour as shown in FIG. 1B.

Figure 1B:
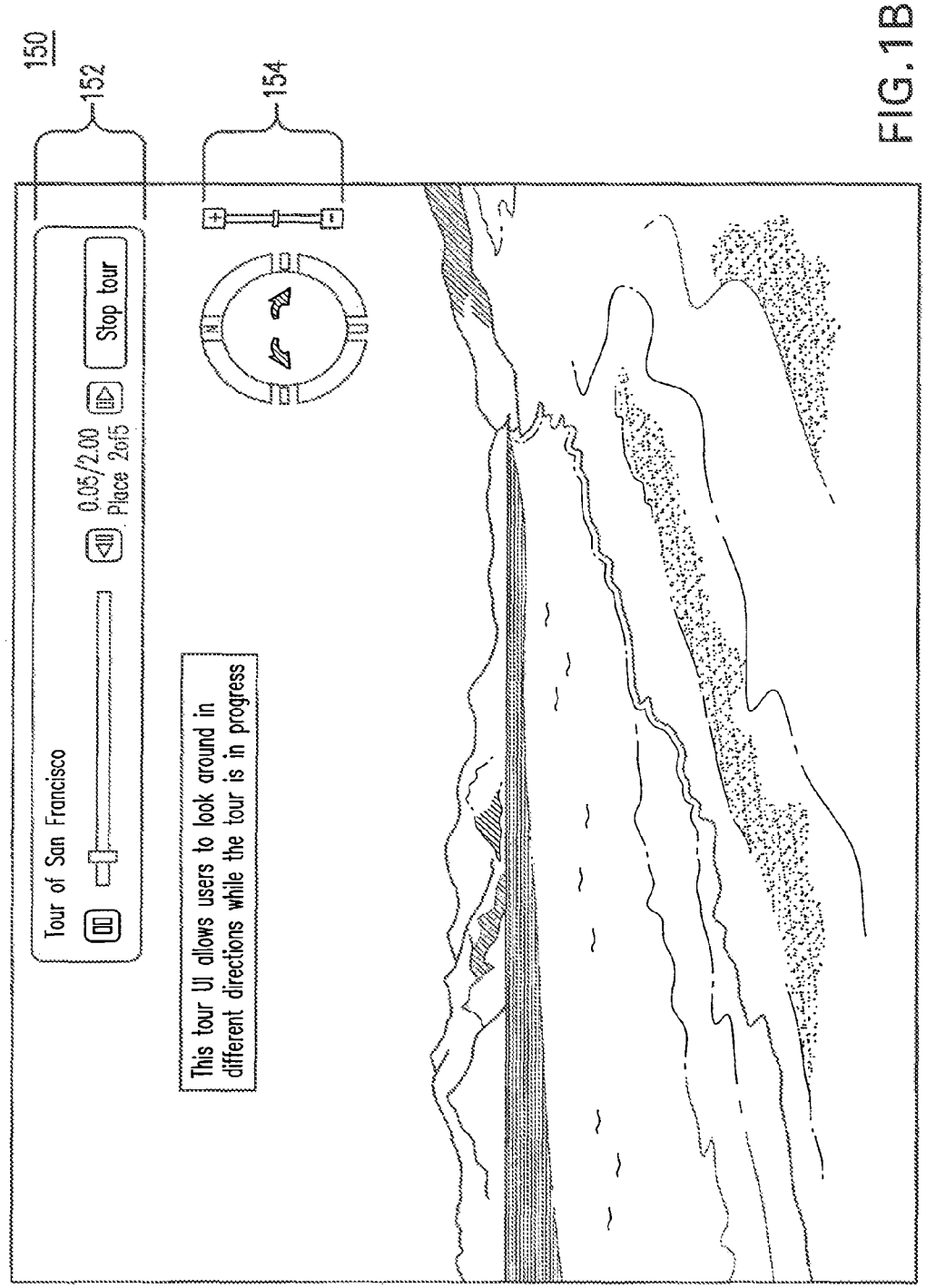
FIG. 1B is a screenshot of a GIS playing a tour according to an embodiment.

FIG. 1B shows a screenshot 150 of a GIS playing a tour according to an embodiment. As the tour plays, the GIS displays different sights to a user as set out by tour actions and a corresponding path. A user may be able to override the tour using tour controls 152 and 154. Tour controls 152 may enable a user to control the tour timeline. For example, tour controls 152 may enable a user to pause, rewind, fast-forward, and chapter-skip the tour.

In an embodiment, a GIS may execute tour controls 152 by controlling the rate at which the tour time elapses. For example, the pause command may cause the tour time to stop elapsing. With the tour time stopped, the virtual camera may remain stationary allowing the user to spend additional time viewing a sight of interest. The fast-forward command may cause the tour time to elapse more quickly. The tour time elapsing more quickly may accelerate motion of the virtual camera. The rewinding command may cause the tour time to decrease. Decreasing the tour time may move the camera along the path in the reverse direction. Finally, chapter skip may change the tour time to the tour time of the next or previous action. As result, the virtual camera may move to a position of a next or previous tour action. Thus by controlling the tour timeline, a user can override the tour. Note that the tour control 152 user interface elements are different from the <TourControl> KML tag that is discussed in detail below.

A user can also override a tour without interrupting the tour timeline. For example, tour controls 154 may enable a user to look around while the tour is in progress. Looking around may change the orientation of a virtual camera while the virtual camera continues to move along the path of the tour. In another example, the user may override the tour by changing the visibility of data or user interface elements.

Figure 2:
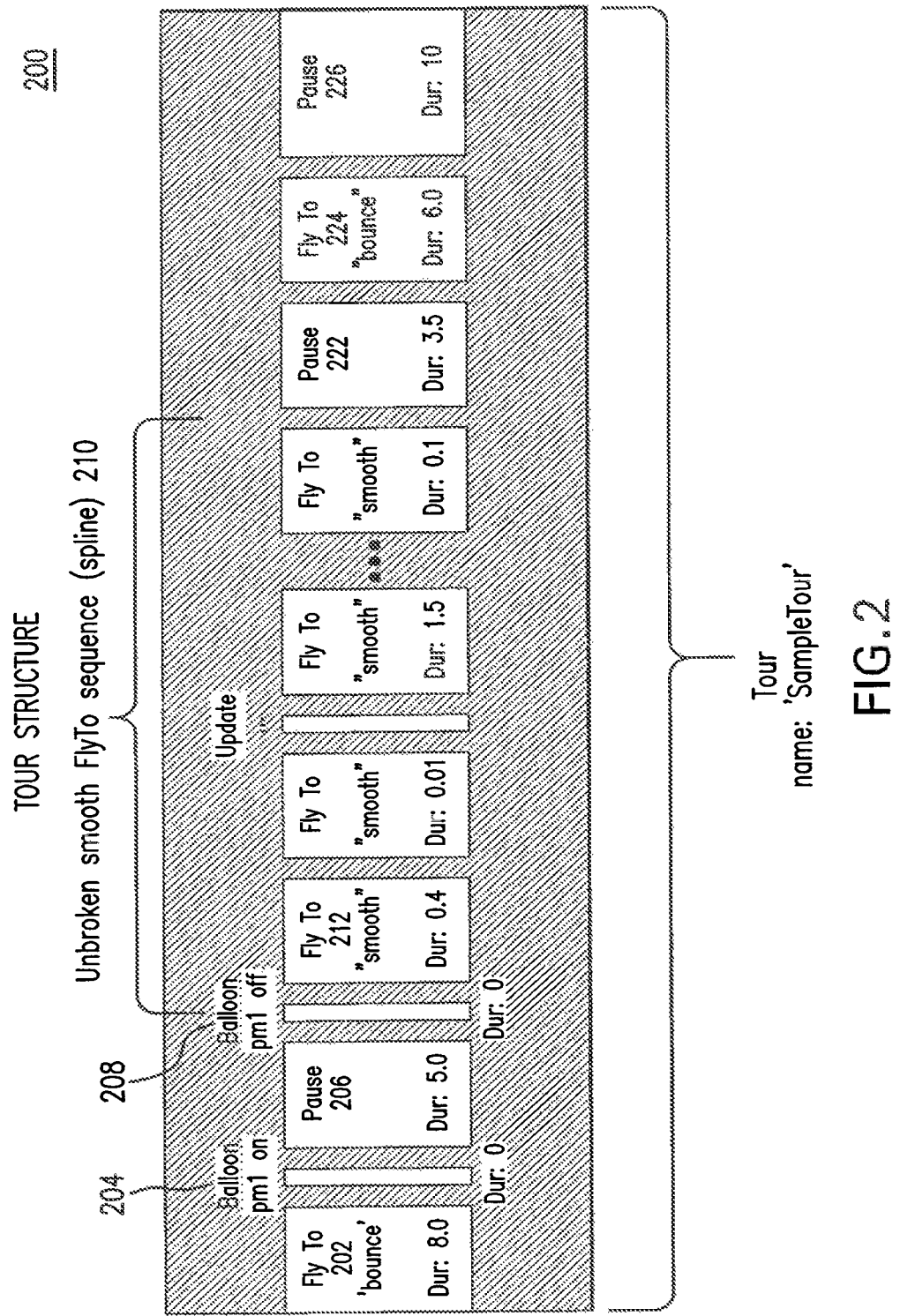
FIG. 2 is a diagram illustrating a sequence of actions in a tour according to an embodiment.

As mentioned earlier, the tour may be defined from actions having associated tour times. FIG. 2 shows a diagram 200 illustrating a sequence of actions in a tour according to an embodiment. Each action includes a duration value. A duration value of an action defines how much tour time elapses to complete the action. If the actions are in a sequence, the point in the tour timeline at which the action occurs may be determined by summing the durations of all the previous actions in the sequence.

One type of action, which may be referred to herein as a fly-to action, may cause the virtual camera to move to a new position. Each fly-to action also may cause the tour to transition to a new feature time period. The sequence of actions starts with a fly-to action 202. Fly-to action 202 instructs the virtual camera to "bounce" to a new position. Bouncing the virtual camera may mean that the virtual camera follows a (perhaps parabolic) trajectory and comes to rest at the new position. The duration of 8 seconds may instruct the GIS to regulate the virtual camera's speed such that the virtual camera comes to rest at its new position in 8 seconds.

When the virtual camera comes to rest at a new position, an action 204 instructs the GIS to display an informational balloon. With the informational balloon displayed to a user, an action 206 instructs the virtual camera to pause at its position for a duration of 5 seconds to afford the user time to view the informational balloon. Then, the informational balloon is turned off at an action 208.

Following action 208 is an unbroken sequence of smooth fly-to actions 210. A smooth fly-to action may instruct the virtual camera to move to a new position at a constant speed. In contrast to a bounce fly-to action, a smooth fly-to action does not necessarily instruct the virtual camera to come to rest at its new position. Sequence of smooth fly-to actions 210 instructs the virtual camera to fly continuously through a series of positions (and possibly feature times). The path that the virtual camera flies the may be determined using spline interpolation. The duration values may control the speed of the virtual camera moves along the path. For example, a fly-to action 212 may specify that the virtual camera move at a speed such that it reaches a new position in 0.4 seconds. So, an unbroken sequence of smooth fly-to actions (such as 210) may specify a continuous, interpolated path for a camera at specified speeds. A sequence of smooth fly-to actions may be broken by an action that instructs the virtual camera to stop. For example, a sequence may be broken by a bounce fly-to action (such as fly-to action 202) or a pause action (such as an action 222).

Sequence of smooth fly-to actions 210 ends at action 222. Action 222 instructs the camera to pause for 3.5 seconds.

After pausing, a fly-to action 224 instructs the camera to bounce to a new position. At that new position, the virtual camera may pause for 10 seconds as instructed by an action 226. This ends the tour specified in diagram 200.

Figure 3:
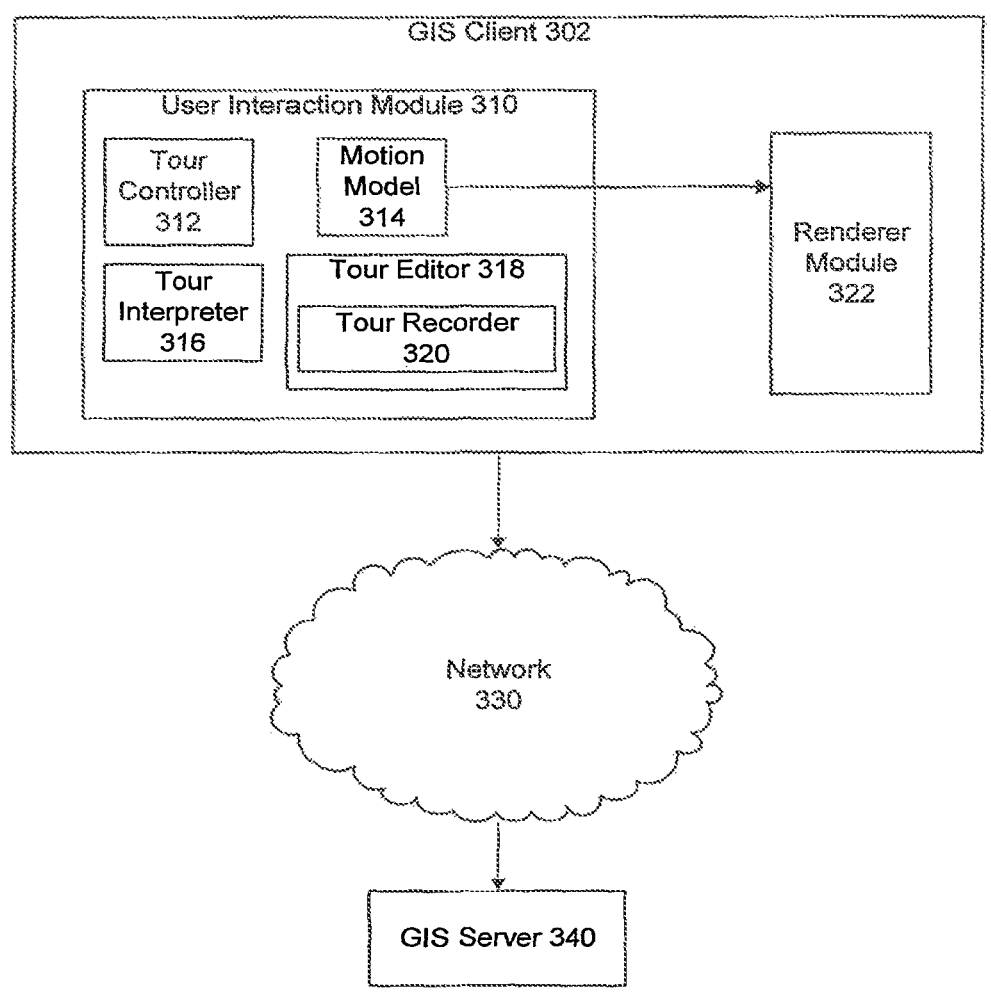
FIG. 3 is a diagram illustrating a GIS that edits and plays tours according to an embodiment.

As described for diagram 200, a sequence of actions may specify a tour. In an embodiment, a GIS may enable a user to create and edit a tour. The GIS also may interpret the sequence of actions to play the tour. FIG. 3 is a diagram illustrating a GIS 300 that edits and plays tours according to an embodiment. GIS 300 includes a GIS client 300 coupled to a GIS server 340 across one or more network(s) 330, such as the Internet.

GIS client 300 includes a user interaction module 310 and a renderer module 322. User interaction module 310 includes a motion model 314. In general, GIS client 302 operates as follows. User interaction module 310 receives user input regarding a location that a user desires to view and, through motion model 314, constructs a view specification defining the virtual camera. Renderer module 322 uses the view specification to decide what data is to be drawn and draws the data. If renderer module 322 needs to draw data that GIS client 302 does not have, GIS client 302 sends a request to GIS server 340 for the additional data.

Motion model 314 constructs a view specification. The view specification defines the virtual camera's viewable volume within a three dimensional space, known as a frustum, and the position and orientation of the frustum in the geographic data. In an embodiment, the frustum is in the shape of a truncated pyramid. The frustum has minimum and maximum view distances that can change depending on the viewing circumstances. Thus, changing the view specification changes the geographic data culled to the virtual camera's viewable volume. The culled geographic data is drawn by renderer module 322.

The view specification may specify three main parameter sets for the virtual camera: the camera tripod, the camera lens, and the camera focus capability. The camera tripod parameter set specifies the fellowing: the virtual camera position (X, Y, Z coordinates); which way the virtual camera is oriented relative to a default orientation, such as heading angle (e.g., north?, south?, in-between?); pitch (e.g., level?, down?, up?, in-between?); and yaw/roll (e.g., level?, clockwise?, and-clockwise?, in-between?). The lens parameter set specifies the following: horizontal field of view (e.g., telephoto?, normal human eye—about 55 degrees?, or wide-angle?); and vertical field of view (e.g., telephoto?, normal human eye—about 55 degrees?, or wide-angle?). The focus parameter set specifies the following: distance to the near-clip plane (e.g., how close to the "lens" can the virtual camera see, where objects closer are not drawn); and distance to the far-clip plane (e.g., how far from the lens can the virtual camera see, where objects further are not drawn).

In addition to motion model 314, user interaction module 310 includes a tour controller 312, a tour interpreter 316, and a tour editor 318. Tour interpreter 316 receives a sequence of actions for a tour. In one embodiment, tour interpreter 316 may parse a Keyhole Markup Language (KML) file that includes the sequence of actions. In the sequence of actions, each action may include a position in the geographic information, and a duration in tour time, and a period of feature time. Tour interpreter 318 also may receive a feature in, for example, a KML file. The feature may have an associated feature time period and a position in the geographic information.

Once tour interpreter 316 receives data for a tour, tour controller 312 plays the tour. To play the tour, tour controller 312 changes a position (and possibly orientation) of the virtual camera as the tour time elapses. Tour controller 312 also may determine a feature time and display features according to the feature time.

Tour controller 312 may determine a path for the virtual camera based on a sequence of fly-to actions. To determine the path, tour controller 312 may interpolate a spline. Based on the duration values in the fly-to actions, the tour controller determines the speed to move the virtual camera along the path. Also, tour controller 312 determines how a feature time elapses as the tour time elapses. In an embodiment, tour controller 312 may determine the camera path, speed, and feature timeline in advance of playing the tour. In another embodiment, tour controller 312 may make those determination while playing the tour in real time.

Tour controller 312 may enable a user to override a playing tour. In response to a user input, tour controller 312 may pause, rewind, fast forward, or chapter skip through the tour. To perform these operations, tour controller 312 may control the tour time. Based on the tour time, tour controller 312 may adjust the position of the camera and the feature time. To pause the tour, tour controller 312 may stop the tour time. To rewind the tour, the tour controller 312 may decrease the tour time. To fast forward the tour, tour controller 312 may increase the tour time at a greater rate. To chapter skip, tour controller 312 may set the tour time to a tour time of the next or previous action.

Tours may be reversible. For example, rewinding a tour to its beginning may return the GIS to the state it was in when the tour began. Tour controller 312 may receive instructions, such as the "<Update>" KML tag, that change the states of the client. As result, tour controller 312 may update a state of the GIS when playing a tour. But to maintain reversibility, tour controller 312 may return the GIS to its previous state when rewinding or exiting a tour. The "<Update>" KML tag is described in more detail below.

Tour controller 312 also may enable a user to override a playing tour by looking around. A user may look around by, for example, moving a mouse or selecting an arrow key on a keyboard. In response to a user input, tour controller 312 may adjust the orientation of a virtual camera. Although the orientation of the virtual camera may change, the tour time may continue to elapse, and the virtual camera may continue to move through the tour. In this way, the user can view surroundings while continuing through a tour.

As mentioned earlier, tour controller 312 may play a tour according to a sequence of actions. The sequence of actions may be determined by touring editor 318. In an example, touring editor 318 may provide a user interface that enables a user to define the actions. The actions, including any fly-to actions for the tour, may then be encoded into a format such as KML. The KML may then be read by tour controller 312 to interpolate a spline for the tour. In an alternative embodiment, tour editor 318 may enable a user to define a continuous path of the virtual camera over time. To define the continuous path, a user may move the virtual camera though geographic information and a tour recorder 320 may record a position (and possibly orientation) of the virtual camera over time. An example user interface which may be used by tour editor 318 and tour controller 312 is described with respect to FIGS. 6A-B.

In addition to camera positions, tour recorder 320 may record other actions. Other actions include popping up an informational balloon and updating a state value in the GIS client. As is described below, updating a state value may change attributes of geographic features, such as visibility, opacity, and position. Tour recorder 320 may also record sound from, for example, a user's microphone. The sound may be synchronized with, for example, camera movements within the GIS made during the recording. In this way, a user may narrate a tour.

Each of GIS client 302 and GIS server 340 may be implemented on any computing device. Such a device may include, but is not limited to, a device having a processor and memory for executing and storing instructions. Such a device may include software, firmware, and hardware. Software may include one or more applications, such as a browser, and an operating system. Hardware can include, but is not limited to, a processor, memory, graphical user interface display and a communications interface. For example, generally GIS client 302 and GIS server 304 may be each implemented on any computing device (or group of computer devices), including but not limited to, a computer, mobile device (such as a handheld, mobile phone, personal data assistant, PDA, or laptop), workstation, embedded system, game console, kiosk, set-top box, television, or cluster of computers. In some applications, GIS clients 302 may be used by users that prefer portability or computing devices that are relatively inexpensive with less processing power and memory, such as, a mobile device or a computer, while GIS server 304 may be a computer device with relatively more processing power and memory, such as, a computer, cluster of computers or workstation.

Figure 4:
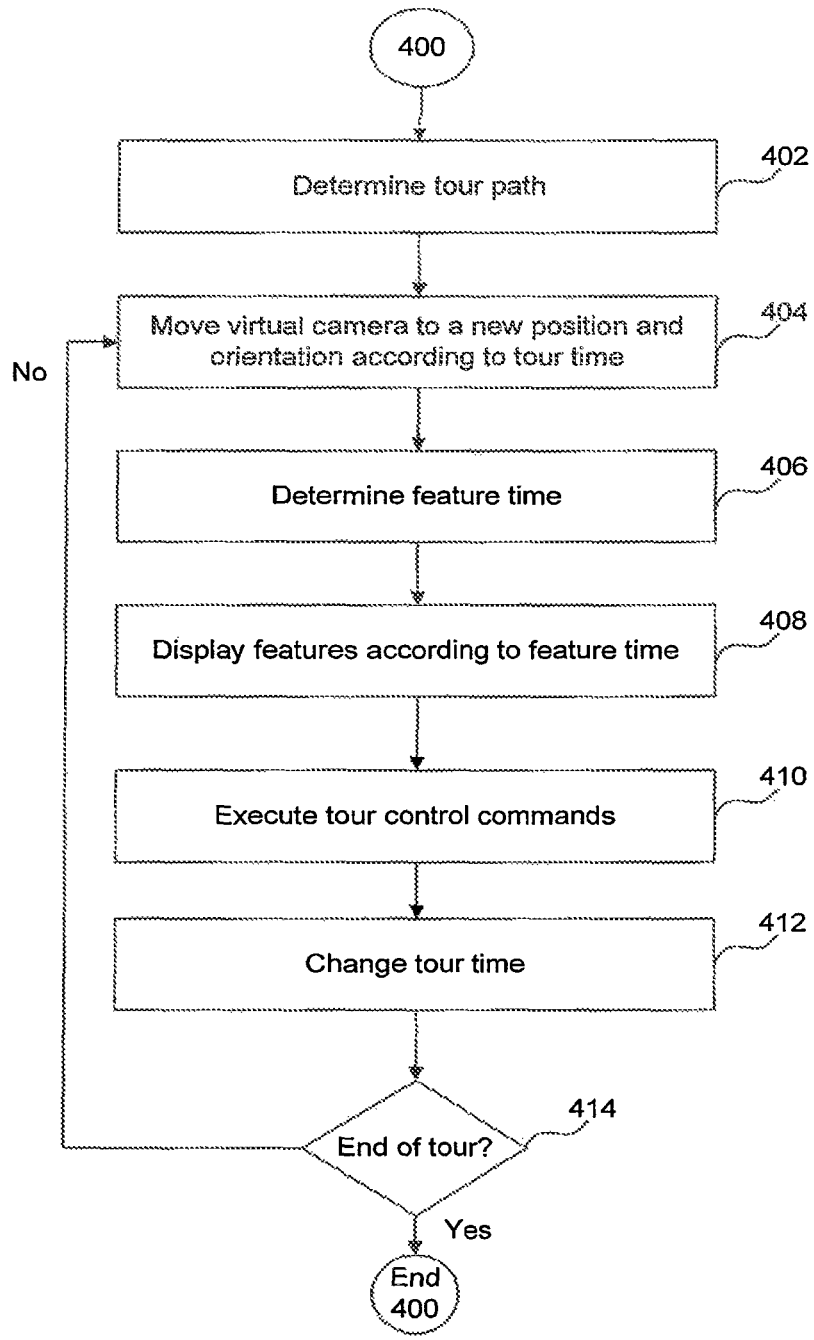
FIG. 4 is a flowchart illustrating a method for playing a tour, which may be used in operation of the system in FIG. 3.

Each of user interaction module 310, tour controller 312, motion module 314, tour interpreter 316, tour editor 318, tour recorder 320, and renderer module 322 may be implemented in hardware, software, firmware, or any combination thereof FIG. 4 is a flowchart illustrating a method 400 for playing a tour, which may be used in operation of GIS 300. Method 400 starts with determining a tour path at step 402. While step 402 is illustrated at the beginning of method 400, a person of skill in the art would recognize that the path of the virtual camera may be determined during the tour in real time. The tour path may determined by interpolating a spline from a sequence of fly-to actions.

In general, steps 404 through 414 form a loop is a the start of the loop, the tour time may be set to zero. Based on the tour time, the virtual camera is moved at step 404 and a feature time is determined at step 406. Features may be displayed according to the feature time at 408. During the loop the tour time may increment or change according to user controls at steps 410 and 412. Finally, the loop terminates when the end of the tour is reached at step 414. Each step is described in more detail below.

At step 404, the virtual camera is moved to a new position and possibly orientation according to a tour time. With the tour time set to zero, the virtual camera is positioned at the start of the tout. As the tour time increases, the virtual camera may be moved along the path determined in step 402.

At step 406, a feature time is determined. The feature time may be determined according to the tour time. At step 408, features are displayed that coincide with the feature with the feature time determined in step 406. Steps 406 and 408 are described in more detail with respect to FIG. 5.

Figure 5:
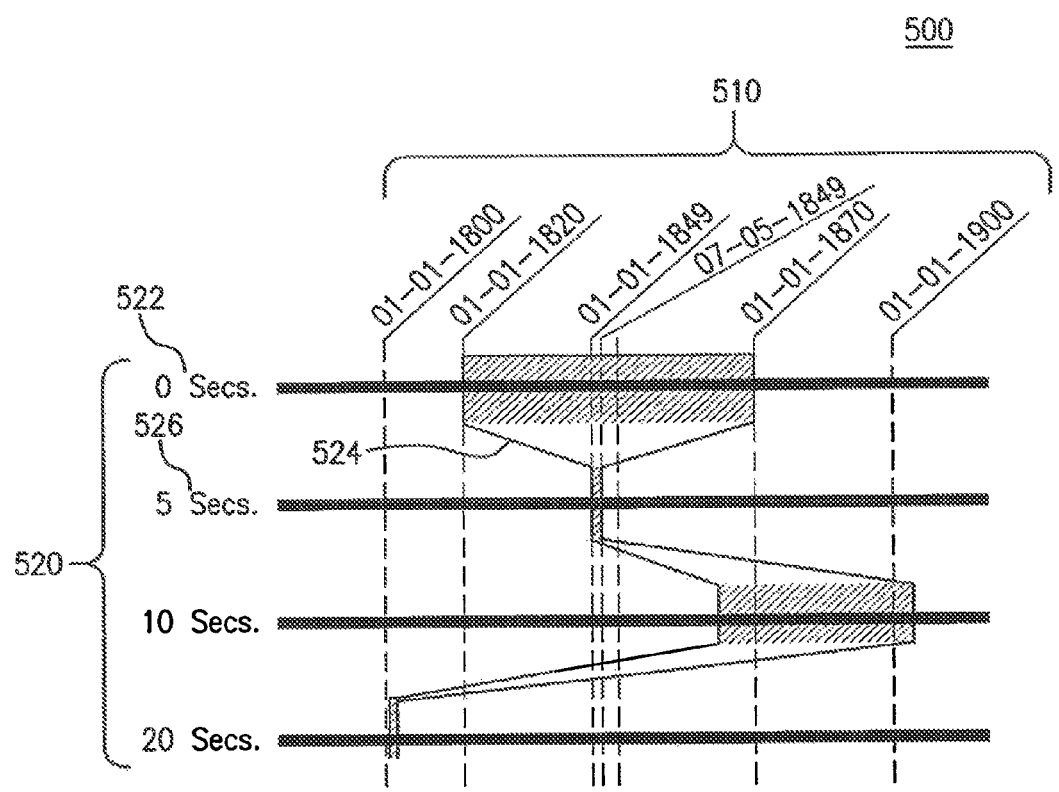
FIG. 5 is a diagram illustrating how a tour time may correspond to a feature time according to an embodiment.

FIG. 5 shows a diagram 500 illustrating how a tour time may correspond to a feature time according to an embodiment. Diagram 500 shows how a tour timeline 520 may correspond to a feature timeline 510. As mentioned earlier, each feature may have a feature time. Each action on a tour may have a tour time and a feature time period. At the tour time of an action, only features having a feature time within the feature time period may be displayed. Between actions, a feature time period may be interpolated, and only features having a feature time falling in the interpolated feature time period may be displayed. Thus, as tour time elapses, the features displayed vary according to their feature time. An example of how feature time varies with tour time is described with respect to diagram 500.

In diagram 500, an action 522 has a tour time of 0 seconds and a feature time period from Jan. 1, 1820 through Jan. 1, 1870. Thus, at the start of the tour, only features having a feature time between Jan. 1, 1820 through Jan. 1, 1870 may be displayed. In an example, the Republic of Texas may be represented as a feature with a feature time in the GIS. The Republic of Texas feature may have a feature time of Mar. 1, 1836. In that example, the Republic of Texas feature is displayed at the start of the tour because Mar. 1, 1836 is between Jan. 1, 1820 and Jan. 1, 1870.

In an alterative embodiment, each feature may have a feature time period. For example, the Republic of Texas feature may have a feature time period of Mar. 1, 1836 through Dec. 29, 1845. In that example, if any part of the action's feature time period falls between Mar. 1, 1836 and Dec. 29, 1845, the feature may be displayed.

In the tour, a next action 526 may have a tour time of 5 seconds. Action 526 has a much shorter feature time period—from July 4 to Jul. 5, 1849. The feature time of the Republic of Texas feature is not in action 526's time period. Thus, the Republic of Texas feature will not appear when the tour time is 5 seconds.

As discussed earlier, the Republic of Texas feature appears when the tour time is 0 seconds as defined by an action 522, but it does not appear at 5 seconds as defined by an action 526. The next question is what features are displayed between 0 and 5 seconds. There are no actions that have a tour time between 0 and 5 seconds to define a feature time period. However, a feature time period may be interpolated as shown by an interpolation 524. The diagram shows a linear interpolation, however other interpolations may be used. By interpolating feature time between actions, the features displayed gradually transition between time periods.

Referring back to FIG. 4, any tour commands are executed at step 410. As described earlier, some tour commands do not interrupt the tour. Non-interrupting tour commands may include looking around, changing visibility of geographic data and modifying the user interface view. Other tour commands include commands that control the timeline of the tour. These commands include pause, rewind, fast forward, and chapter skip. This commands may affect how the tour time is changed at step 412. If are no command are received that control the tour timeline, then the tour time is incremented by a predetermined amount.

Tour commands may be entered by a user, as described with respect to FIG. 1B. Alternatively, tour commands may be received as an action encoded, for example, in KML. In one example, a tour command encoded in KML may pause the tour time until a user input is received. In another example, tour commands encoded in KML may specify a loop for the tour to follow.

At step 414, the tour time may be compared to a length of the tour. If the tour time is equal to or greater than the length of the tour, than the loop terminates and the tour ends.

Figure 6A:
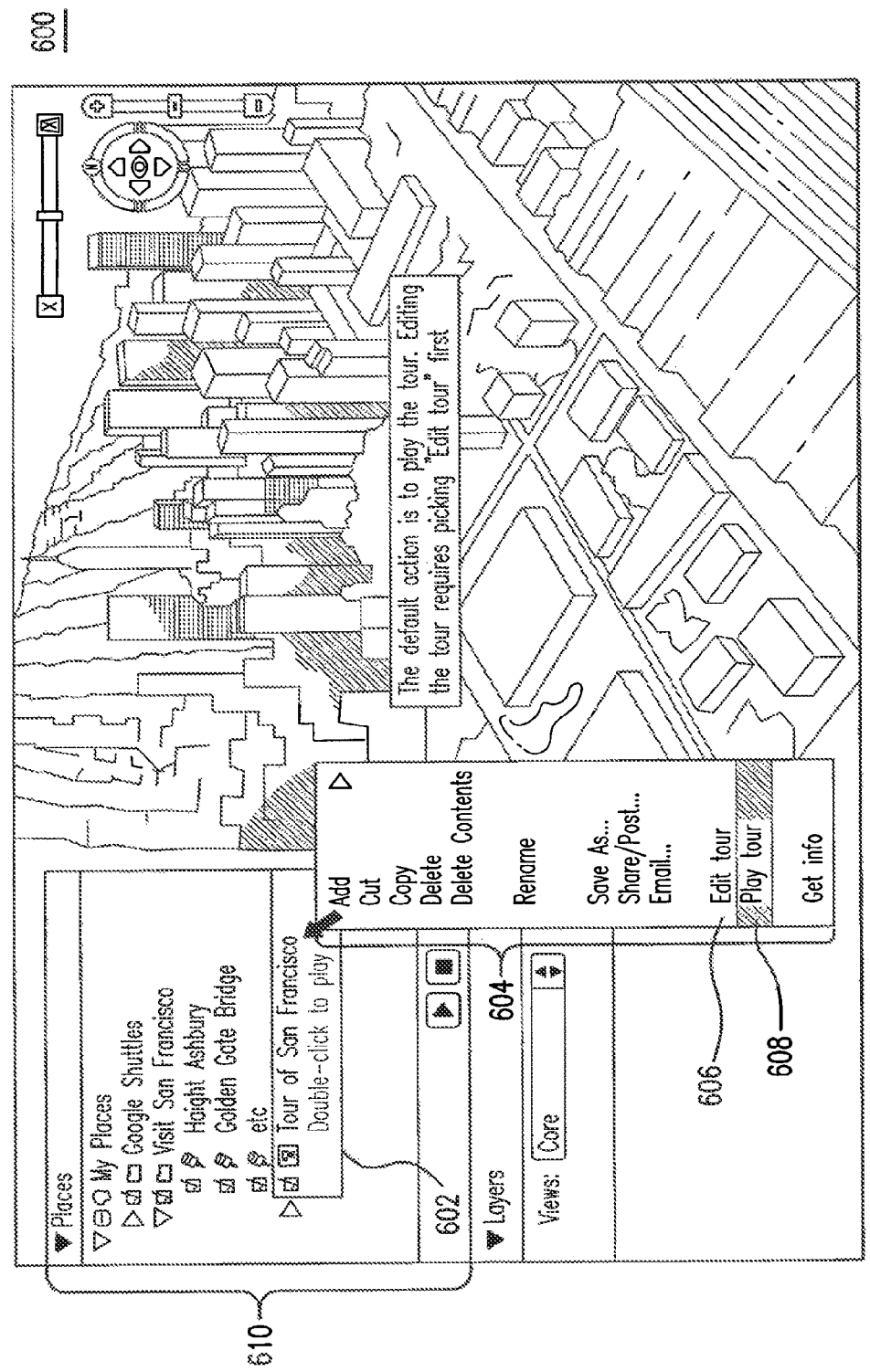
FIGS. 6A-B are screenshots of a GIS including a tour editor.
Figure 6B:
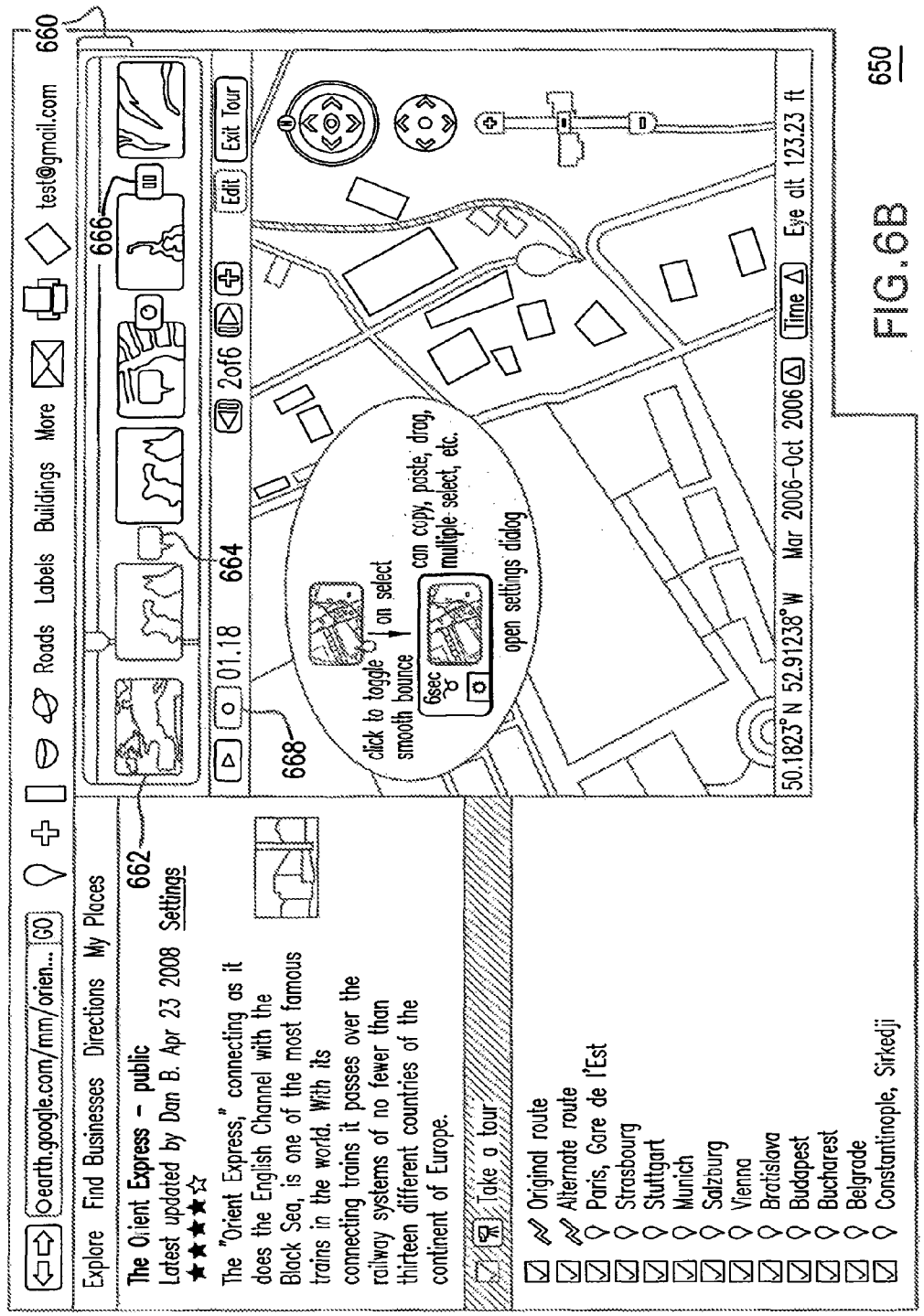

As mentioned earlier, a GIS may include a tour editor that enables a user to create and edit a tour. FIGS. 6A-B show screenshots of a GIS including a tour editor.

FIG. 6A shows a screenshot 600 of a GIS. Screenshot 600 includes a places menu 610. Places menu 610 has a tour option 602. Double clicking option 602 may play a tour of San Francisco. Right clicking option 602 may display a menu 604. Menu 604 offers to the user an edit option 606 and a play option 608. Again, play option 608 may play the tour. Edit option 606 may transition the user to an edit interface as in FIG. 6B.

FIG. 6B shows a screenshot 650 illustrating an interface to edit a tour. Screenshot 650 includes a panel 660. Panel 660 has thumbnail images depicting actions on the tour. The thumbnail images, such as a thumbnail image 662, preview the perspective of the virtual camera from a position of an action. Panel 660 also has icons for other possible actions on a tour. For example, an icon 662 indicates that an informational balloon will appear and an icon 666 indicates a pause in the tour.

Screenshot 650 also has a record button 668. When record button 668 is selected, the GIS starts to record the position of the virtual camera. For example, the GIS may create a fly-to action from a position of a virtual camera. Alternatively, the GIS may record the path of the virtual camera over time. The GIS may also record other actions like popping balloons, and updating geo-spatial content, such as toggling the visibility of KML features, or changing the position and/or opacity of features.

Figure 7:
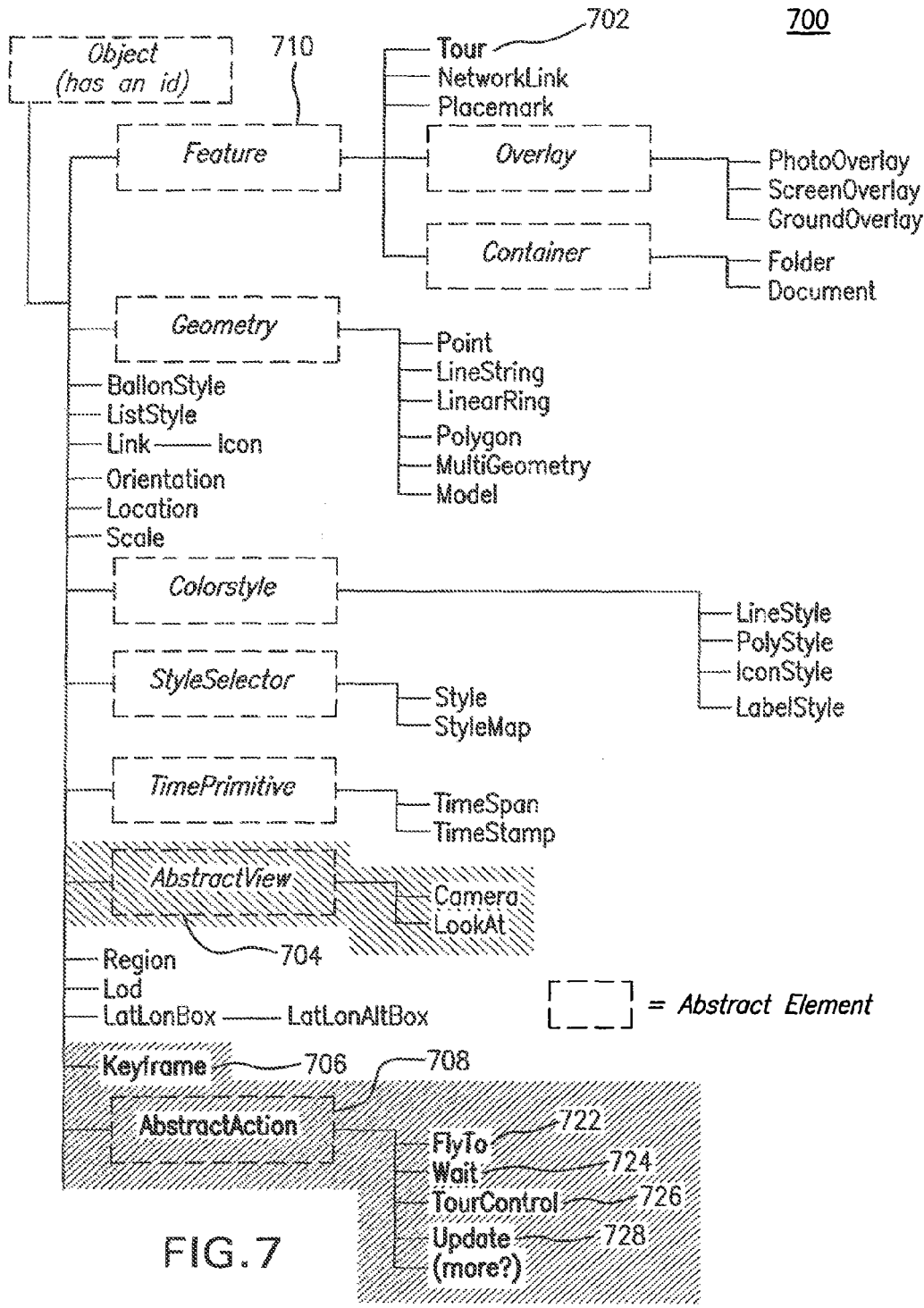
FIG. 7 is a diagram illustrating a KML schema which may be used to specify a tour.

FIG. 7 is a diagram 700 illustrating an example KML schema which may be used to specify a tour. Diagram 700 illustrates several new or modified KML elements not included in conventional KML elements. The new or modified KML elements include a Tour element 702, an AbstractView element 704, a Keyframe element 706, and an AbstractAction element 708.

Tour element 702 specifies a tour. For example, tour element 702 may specify a tour as illustrated in FIG. 7. Tour element 702 may derive from a Feature element 710. Tour element 702 may include information about the tour, such as a title and description. Further, tour element 702 include a playlist that includes a sequence of AbstractActions elements 708. In an embodiment, tour element 702 may have a schema:

```
<complexType name="TourType" abstract="true">
    <complexContent>
        <extension base="kml:FeatureType">
            <sequence>
            <element name="InitialView"
            type="kml:AbstractViewType"
minOccurs="0"/>
            <element name="Metadata"
            type="kml:MetadataType"
minOccurs="0"/>
            </sequence>
        </extension>
    </complexContent>
</complexType>
```

An example of tour element 702 is:

```
<Tour>
    <name>...</name>
    <description>...</description>
    <Playlist>
        <AbstractAction/>
        <AbstractAction/>...
        <AbstractAction/>
    </Playlist>
</Tour>
```

As mentioned earlier, tour element 702 may include a sequence of AbstractAction elements 708. Each AbstractAction element 708 may describe an action including a tour time (such as a duration). AbstractAction element 708 serves as a base element for a number of different types of actions that may be executed during a tour. For example, AbstractAction element 708 may serve as a base for a FlyTo element 722, a wait element 724, a TourControl element 726, and an Update element 728. AbstractAction element 708 may also include an update element or other elements indicated by "more?" depending a particular application.

Wait element 724 instructs the GIS to keep the camera stationary the tour for a specified duration. Meanwhile, the tour time may continue to elapse. In an example KML snippit including a wait element 724 is:

```
<Wait>
    <duration>1.5</ duration >
</Wait>
```

TourControl element 726 encodes control instructions for the playback of a tour. For example, TourControl element 726 may pause the tour time until the user inputs a desire to continue the tour. TourControl element 726 also may be used to define a tour that loops. For example, TourControl element 726 may be used to define a circular path for a tour that continues until the user stops it. In another example, a series of TourControl elements 726 that pause the tour may together create a slide show effect in the tour.

Update element 728 changes a state value in the GIS client. The state value may be an attribute of a geographic feature, such as a feature encoded in a KML file. In examples, the feature may be a placemark, GroundOverlay, ScreenOverlay, or other geographic features. The feature may have attributes such as visibility, position, orientation, opacity, and size. By updating a visibility attribute, update element 728 may make a feature appear or disappear. By updating a position attribute, update element 728 may move a feature.

Update element 728 may transition an attribute to a new state over a period of time. To this end, update element 728 may include a duration value that indicates how much tour time should elapse during the state transition. For example, an update element changes the position of a feature to point Y. The update element has a duration of 5 seconds. The feature may be positioned at point X when the tour time is at 0 seconds. After 5 seconds the feature may be located at point Y. In between 0 and 5 seconds the position of the feature is interpolated. In this way, update element 728 may be used to gradually transition a feature to a new location creating the effect of animation. Update element 728 also may gradually change other feature attributes, such as size, opacity, orientation, color and geometry, to create an animation effect and explore geocoded content. For example, a feature may be shaped as a first polygon and may transition in shape to a second polygon by changing a geometry attribute.

FlyTo element 722 encodes an action. FlyTo element 722 instructs a GIS to move a virtual camera to a new location on a tour. FlyTo element 722 encodes a location within geographic information and an optional feature time. As described for FIG. 2, FlyTo element 722 may have one of two types—"bounce" and "smooth"—that specifies how to move the virtual camera. Finally, FlyTo element 722 may include an AbstractView element 704 that defines the location and feature time to transition to. In an embodiment, FlyTo element 722 may have a schema:

```
<complexType name="FlyToType" abstract="false">
    <complexContent>
        <extension base="kml:AbstractActionType">
            <sequence>
```

```
            <element name="View" type="kml:AbstractView"
                minOccurs="0"/>
            <element name="type" type="kml:StringType"
                minOccurs="0"/>
        </sequence>
    </extension>
</complexContent>
</complexType>
```

An example FlyTo element 722 is:

```
<FlyTo>
    <duration>3.6</duration>
    <method>Bounce</method>
    <AbstractView>
    ...
    </AbstractView>
</FlyTo>
```

As mentioned earlier, AbstractView element 704 may include a feature time. The feature time may be defined with a TimePrimitive element. A TimePrimitive element may define either a point in time or a period of time. In an embodiment, AbstractView element 704 may have the following schema extension:

```
<complexType name="AbstractViewType" abstract="true">
    <complexContent>
        <extension base="kml:ObjectType"/>
        <all>
            <element ref="kml:TimePrimitive" minOccurs="0"
                maxOccurs="1"/>
        </all>
    </complexContent>
</complexType>
```

Although not shown in diagram 700, the KML schema may also include a BalloonPop element that defines an informational balloon. An informational balloon may display content, such as text, images, or video, to a user in a balloon graphic. An informational balloon is described with respect to FIG. 2.

Further, the KML schema may have a element that instructs the GIS to fly the virtual camera into and around a photo. Such a photo may be as described in a KML Photo-Overlay tag. In an embodiment, a GIS may fly the virtual camera to a focal point of the photo and enable a user to navigate within a photo in a photo navigation mode.

In an embodiment, flying the user into photo navigation mode effectively moves the virtual camera to a natural origin of the photo. The natural origin is a point in front of the image surface at or slightly beyond the focal length of the camera that took the photo. The virtual camera is oriented normal to the surface, such that the virtual camera is looking into the surface. When a GIS enters photo navigation mode, the GIS may change the focal length and view frustum of the virtual camera to match those of the camera that took the photo.

The navigation operations in photo navigation mode may include panning, zooming, autopilot, and joystick motion. Panning drags the image to follow a mouse movement while the mouse button is depressed. Zooming simulates the camera getting closer to the picture. Zooming may result in higher resolution image tiles being displayed from an image pyramid. When the user double clicks on a point, autopilot motion may simulate the camera smoothly centering on the point in the image. Autopilot may zoom in or out depending on which mouse button the user double clicked. Joystick motion uses either the keyboard arrows or a joystick interface to move the view around, for example, at a constant speed.

The KML schema may also include an element that play sounds. The KML element may include a reference to a sound file, such as an MP3 or WAV file. Using this element, a tour may have an accompanying soundtrack.

Figures 1, 8:

FIGS. 8-1 and 8-2 show a KML code 800 defining a tour according to the schema illustrated diagram 700. KML code 800 includes a code portion 802 that defines several features including an American Revolution feature and a Boston Tea Party feature. Each feature has a associated feature time span. The American Revolution feature begins in 1775 and ends in 1776, and the Boston Tea Party begins on Dec. 16, 1773 and ends on Dec. 17, 1773.

Following code portion 802 is a code portion 810 defining a tour. The tour begins with a FlyTo element 812 that results in the virtual camera bouncing to a new location over the course of 10 seconds. Then, a Wait element 814 keeps the virtual camera stationary for 1 second. Following Wait element 814 is a TourControl element 816. TourControl element 816 pauses the tour until a user input is received with an instruction to resume the tour. After a user input is received, a Wait element 818 keeps the virtual camera stationary for 0.2 seconds. Then, a FlyTo element 820 bounces the virtual camera to a new location. At the new location, a Wait element 822 keeps the camera stationary for 5 seconds. After the 5 seconds elapse, the tour terminates.

In this way, embodiments of the present invention controls a position of a virtual camera over time. This improves the tour user experience.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for touring geographic information in a three-dimensional geographic information system, comprising:
    (a) receiving, by one or more computing devices, a set of actions for a tour, each action including a tour time, wherein a tour time of at least one of the actions is defined by a user, the set of actions including a fly-to action that includes position and orientation values defined by the user, wherein an action specifies an instruction to be executed to tour geographic information in the geographic information system and a duration value of an action defines how much tour time elapses to complete the action, and wherein the receiving comprises parsing a geographic markup file;

(b) executing, by the one or more computing devices, each action in the set of actions to tour geographic information in the geographic information system, the executing comprising moving, at a time specified by a tour time associated with the fly-to action, a virtual camera through a three-dimensional environment of the geographic information system according to the position and orientation values included in the fly-to action, wherein a first speed of the virtual camera moving through the three-dimensional environment is based on a first tour time associated with a first action, a second speed of the virtual camera moving through the three-dimensional environment is based on a second tour time associated with a second action different from the first action, and the first speed is defined independently of the second speed, and wherein the virtual camera at least in part specifies which geographic information in the geographic information system to display; and (c) interpolating a path, by the one or more computing devices, based on tow or more locations, each location associated with a different action in the set of actions wherein the executing (b) further comprises moving the virtual camera along the path.

2. The method of claim 1, wherein the receiving (a) comprises receiving the set of actions tor the tour, at least one action in the set of actions including a feature time.

3. The method of claim 2, further comprising:
receiving a geographic feature having an associated feature time period and a position in the geographic information;
determining a current geographic feature time based on a current tour time; and
displaying the geographic feature when the current geographic feature time is during the associated feature time period and the position is in a view frustum of the virtual camera.

4. The method of claim 1, further comprising:
interpolating a spline based on two or more locations, each location associated with a different action in the set of actions,
wherein the executing (b) further comprises moving the virtual camera along the spline.

5. The method of claim 1, further comprising:
enabling a user to pause, rewind, or fast forward the tour.

6. The method of claim 1, further comprising:
enabling a user to define the set of actions, wherein the enabling comprises:
(i) enabling a user to define an action to move the virtual camera; and
(ii) recording a position of the virtual camera.

7. The method of claim 1, further comprising:
overriding the tour in response to a first user input, wherein the overriding comprises changing the orientation of the virtual camera according to a second user input.

8. The method of claim 1, further comprising:
overriding the tour in response to a first user input, wherein the overriding comprises:

(i) moving the virtual camera off a path of the tour according to a second user input; and
(ii) moving the virtual camera back to the path of the tour in response to a third user input.

9. The method of claim 1, wherein the executing (b) further comprises moving the virtual camera toward a focal point of a photo.

10. A geographic information system for touring geographic information in a three-dimensional geographic information system, the geographic information system comprising one or more processors and memory configured to implement:
a tour controller that:
(i) receives a set of actions for a tour, each action including a tour time, wherein a tour time of at least one of the actions is defined by a user, the set of actions including a fly-to action that includes position and orientation values defined by the user,
(ii) executes each action in the set of actions to tour geographic information in the geographic information system, wherein the tour controller moves, at a time specified by a tour time associated with the fly-to action, a virtual camera through a three-dimensional environment of the geographic information system according to the position and orientation values included in the fly-to action,
(iii) interpolates a path based on two or more locations, each location associated with a different action in the set of actions, wherein the executing further comprises moving the virtual camera along the path; and
a tour interpreter that parses a geographic markup file,
wherein a first speed of the virtual camera moving through the three-dimensional environment is based on a first tour time associated with a first action, a second speed of the virtual camera moving through the three-dimensional environment is based on a second tour time associated with a second action different from the first action, and the first speed is defined independently of the second speed,
wherein the virtual camera at least in part specifies which geographic information in the geographic information system to display, and an action specifies an instruction to be executed to tour geographic information in the geographic information system, and a duration value of an action defines how much tour time elapses to complete the action.

11. The system of claim 10, wherein at least one action in the set of actions includes a feature time.

12. The system of claim 11, wherein the tour controller receives a geographic feature having an associated feature time period and a position in the geographic information and determines a current feature time based on a current time in the tour and sends a signal to display the geographic feature when the current feature time is during the associated feature time period and the position is in a view frustum of the virtual camera.

13. The system of claim 10, wherein the tour controller interpolates a spline based on two or more locations, each location associated with a different action in the set of actions and moves the virtual camera along the spline.

14. The system of claim 10, wherein the tour controller enables a user to pause, rewind, or fast forward the tour.

15. The system of claim 10, wherein the tour controller changes the orientation of the virtual camera according to a user input.

16. An apparatus comprising at least one non-transitory computer readable storage medium encoding instructions thereon that, in response to execution by a computing device, cause the computing device to perform operations comprising:
- (a) receiving a set of actions for a tour, each action including a tour time, wherein a tour time of at least one of the actions is defined by a user, the set of actions including a fly-to action that includes position and orientation values defined by the user, wherein an action specifies an instruction to be executed to tour geographic information in the geographic information system and a duration value of an action defines how much tour time elapses to complete the action, and wherein the receiving comprises parsing a geographic markup file;
- (b) executing each action in the set of actions to tour geographic information in the geographic information system, the executing comprising moving, at a time specified by a tour time associated with the fly-to action, a virtual camera through a three-dimensional environment of the geographic information system according to the position and orientation values included in the fly-to action,
wherein a first speed of the virtual camera moving through the three-dimensional environment is based on a first tour time associated with a first action, a second speed of the virtual camera moving through the three-dimensional environment is based on a second tour time associated with a second action different from the first action, and the first speed is defined independently of the second speed, and
wherein the virtual camera at least in part specifies which geographic information in the geographic information system to display; and
- (c) interpolating a path based on tow or more locations, each location associated with a different action in the set of actions, wherein the executing (b) further comprises moving the virtual camera along the spline.

17. The apparatus of claim 16, wherein the receiving (a) comprises receiving the set of actions for the tour, at least one action in the set of actions including a feature time.

18. The apparatus of claim 16, wherein the at least one non-transitory computer readable storage medium encoding instructions thereon that, in response to execution by the computing device, cause the computing device to perform operations further comprising:
receiving a geographic feature having an associated feature time period and a position in the geographic information;
determining a current geographic feature time based on a current tour time; and
displaying the geographic feature when the current geographic feature time is during the associated feature time period and the position is in a view frustum of the virtual camera.

19. The apparatus of claim 16, wherein the at least one non-transitory computer readable storage medium encoding instructions thereon that, in response to execution by the computing device, cause the computing device to perform operations further comprising:
interpolating a spline based on two or more locations, each location associated with a different action in the set of actions, wherein the executing (b) further comprises moving the virtual camera along the spline.

20. The apparatus of claim 16, wherein the at least one non-transitory computer readable storage medium encoding instructions thereon that, in response to execution by the computing device, cause the computing device to perform operations further comprising:
overriding the tour in response to a first user input, wherein the overriding comprises changing the orientation of the virtual camera according to a second user input.

* * * * *